United States Patent [19]

Maebayashi et al.

[11] Patent Number: 4,711,485
[45] Date of Patent: Dec. 8, 1987

[54] OPEN TOP TYPE AUTOMOBILE BODY STRUCTURE

[75] Inventors: Jiro Maebayashi; Masaya Hamamoto, both of Hiroshima, Japan

[73] Assignee: Mazda Motor Corporation, Hiroshima, Japan

[21] Appl. No.: 788,955

[22] Filed: Oct. 18, 1985

[30] Foreign Application Priority Data

Oct. 19, 1984 [JP] Japan ............................... 59-220256
Dec. 3, 1984 [JP] Japan ........................... 59-183458[U]

[51] Int. Cl.$^4$ .............. B60J 7/12; B60J 7/14; B60J 7/19; E05D 3/06
[52] U.S. Cl. ............................... 296/108; 296/116; 280/756; 16/331; 16/348; 16/366
[58] Field of Search .............................. 296/107–109, 296/111, 117, 118, 112, 216, 218, 219, 116; 280/756; 16/331, 360, 366, 348

[56] References Cited

U.S. PATENT DOCUMENTS

| | | | |
|---|---|---|---|
| 2,729,502 | 1/1956 | Hale | 296/117 |
| 2,939,742 | 6/1960 | Dardarian et al. | 296/117 X |
| 3,091,494 | 5/1963 | Cohen | 296/107 |
| 3,096,117 | 7/1963 | Hallenbeck | 296/107 |
| 3,603,636 | 9/1971 | Carella | 296/218 |
| 4,557,502 | 12/1985 | Scaduto et al. | 296/109 X |

FOREIGN PATENT DOCUMENTS

| | | | |
|---|---|---|---|
| 814396 | 9/1951 | Fed. Rep. of Germany | 296/107 |
| 3236034 | 3/1984 | Fed. Rep. of Germany | 296/216 |
| 48230 | 3/1984 | Japan | 296/216 |
| 2086316 | 5/1982 | United Kingdom | 296/107 |

*Primary Examiner*—Dennis H. Pedder
*Attorney, Agent, or Firm*—Fleit, Jacobson, Cohn & Price

[57] ABSTRACT

An open top automobile body including a rigid roof panel extending between the front windshield section and a hoop member of a substantially inverted U-shape mounted at the opposite leg portions to the rear fenders for fore-and-aft swinging movements between an erected position and a retracted position. A foldable hood is provided between the hoop member and the rear body section to provide a rear windshield section. The roof panel is connected at the rear edge through a hinge mechanism with the hoop member so that the roof panel can be retracted into the rear body section together with the hoop member. A locking member prevents a relative rotation of two links of the hinge mechanism with respect to each other when the hoop member is in the erected position and the roof panel is placed between the front windshield and the hoop member.

38 Claims, 29 Drawing Figures

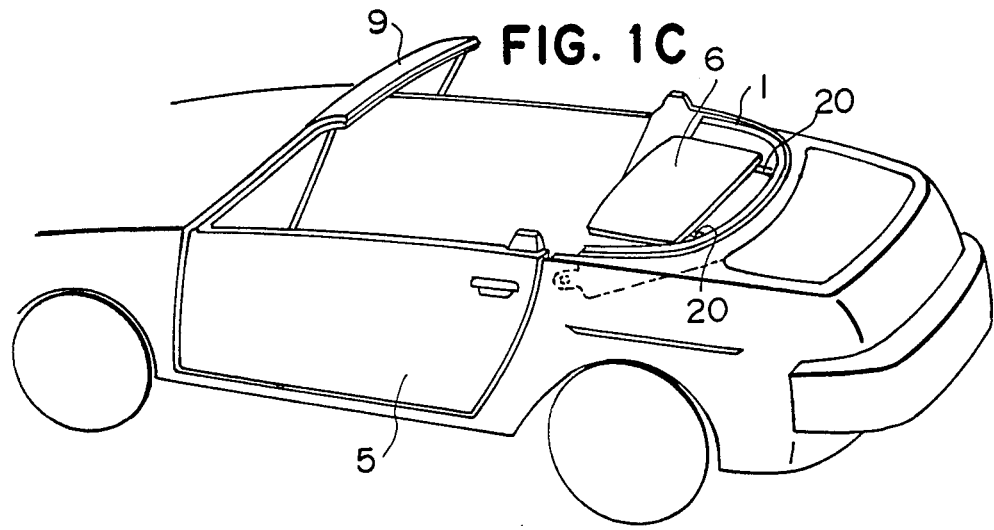
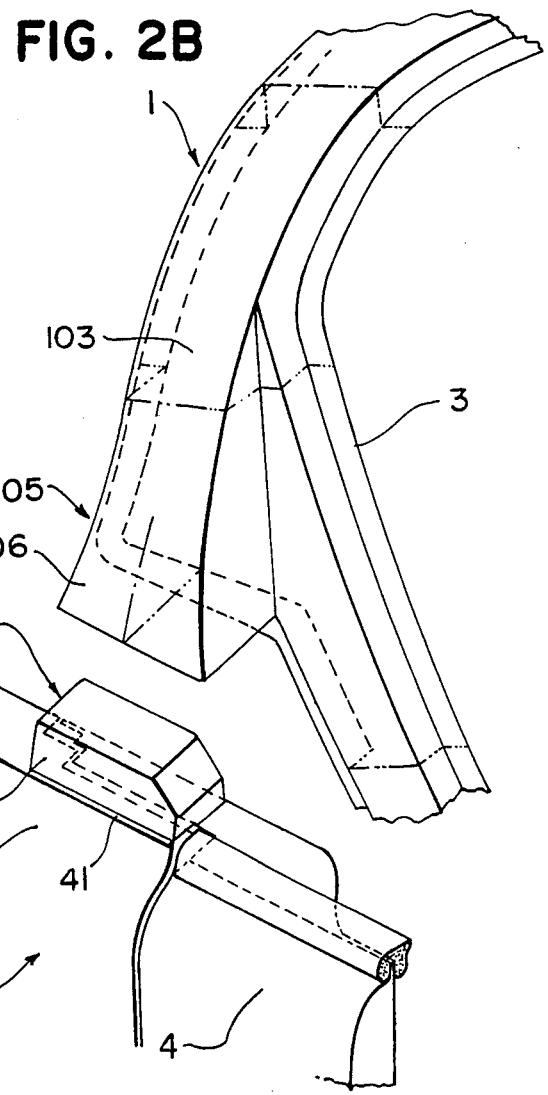

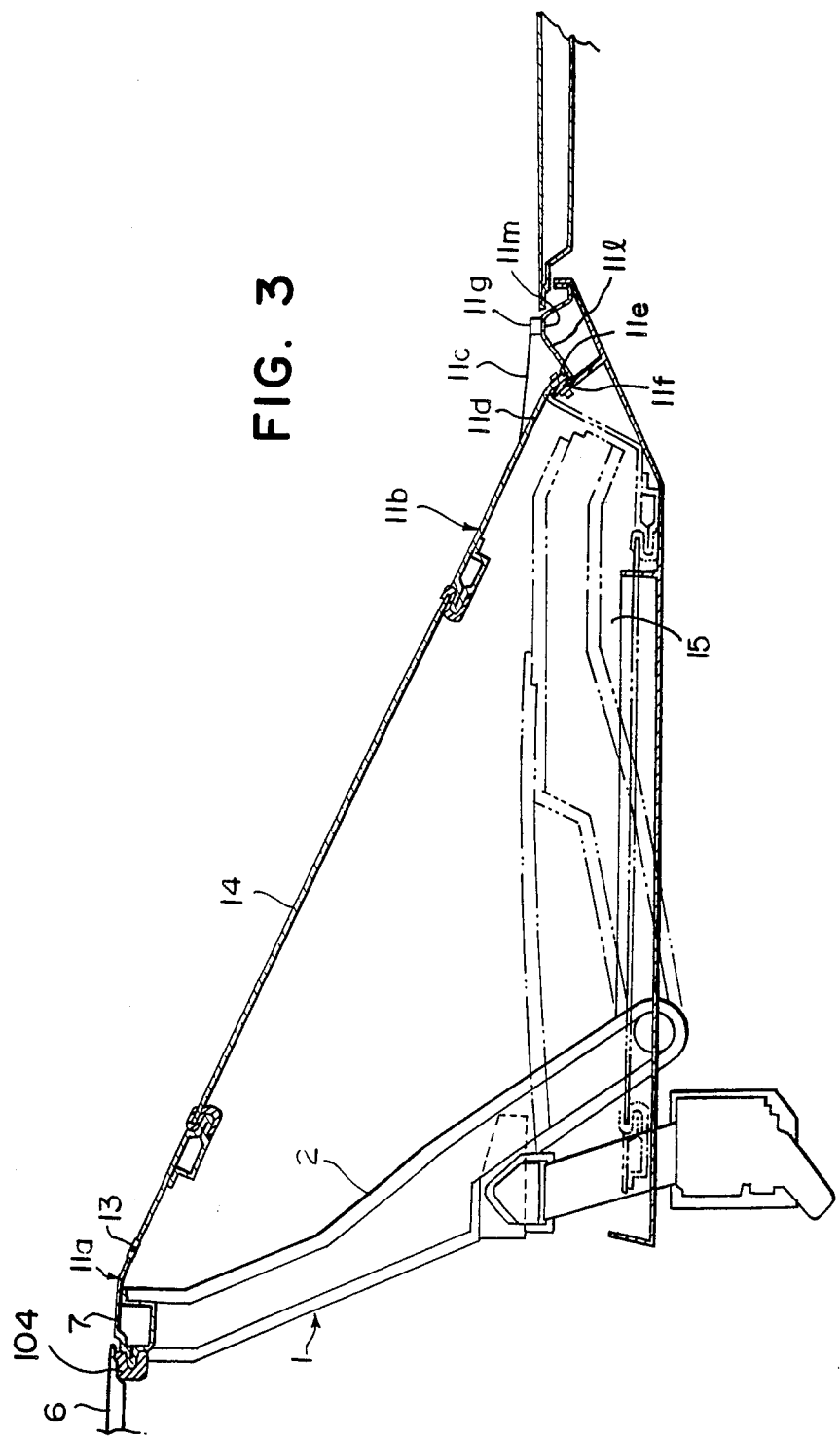

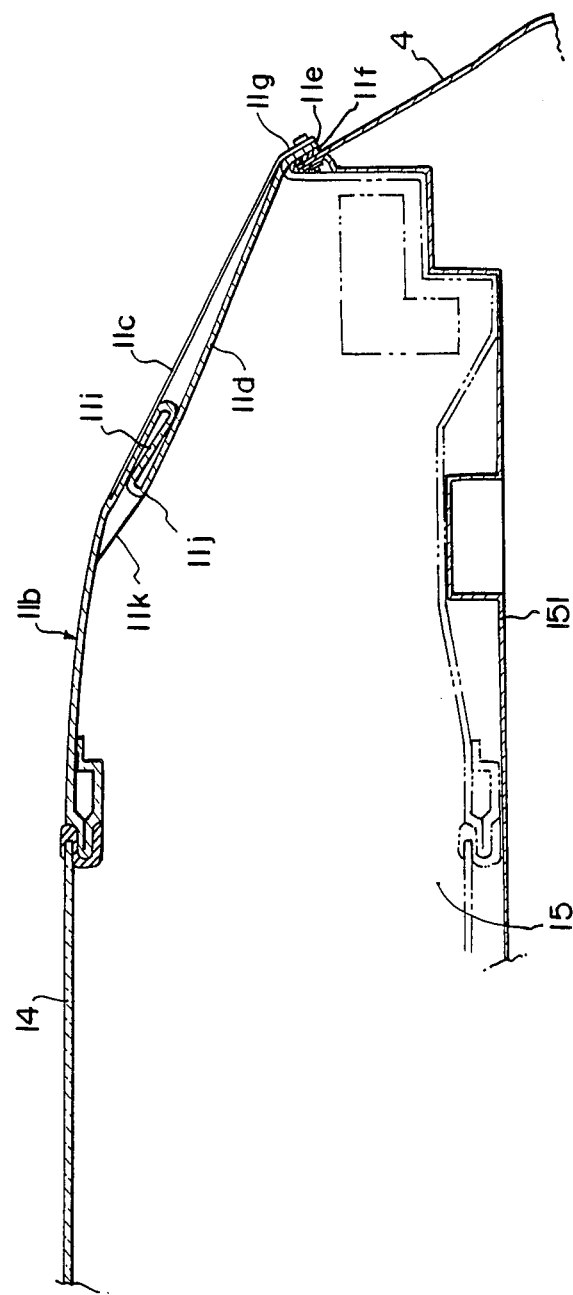

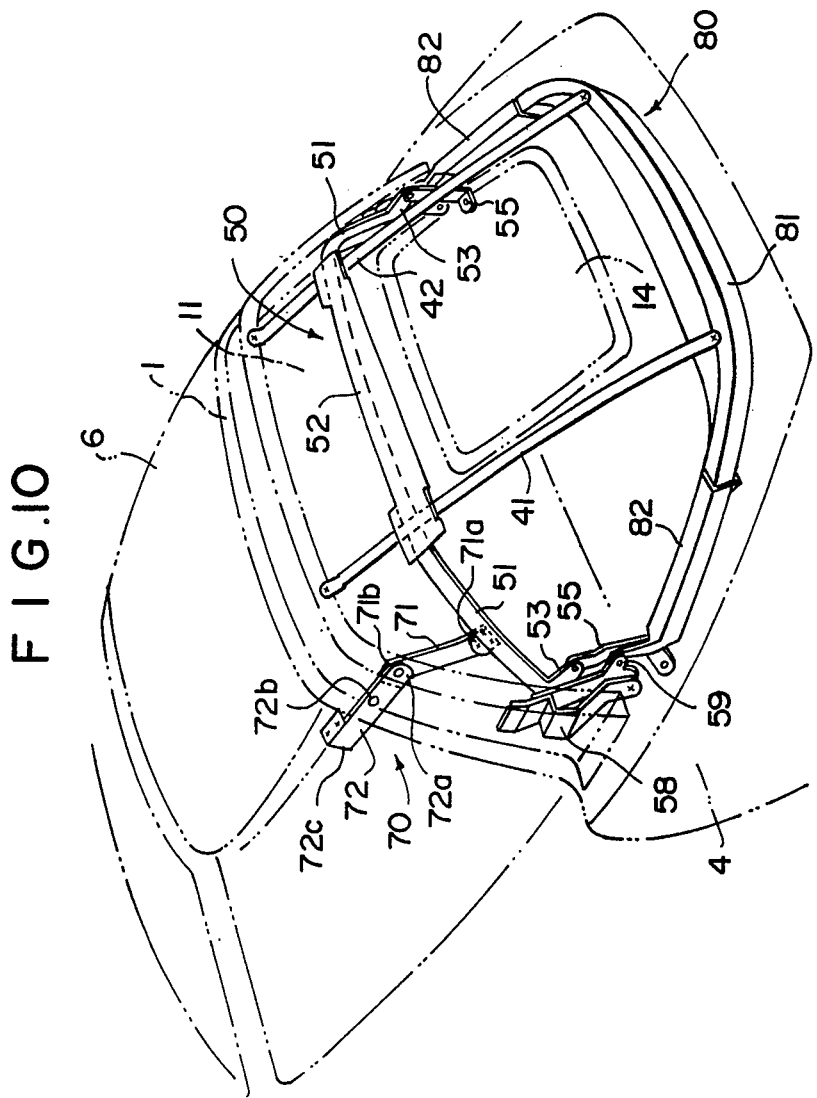

OPEN TOP TYPE AUTOMOBILE BODY STRUCTURE

BACKGROUND OF THE INVENTION

Field of the Invention

The present invention relates to an automobile upper body structure, and more particularly to an automobile upper body structure of an open top type. More specifically, the present invention pertains to a full open type automobile upper body structure wherein the roof panel and the rear windshield can be removed and/or fully retracted.

Description of Prior Art

Conventionally, an open top type automobile includes a foldable hood which normally covers the top and rear sections when extended for bad weather operations but can be folded rearward to completely open the top and rear sections of the upper body structure for operations in fine weather. It has however been experienced in this type of body structure that it is difficult to maintain the weather tight properties throughout the life of the automobile since the seals between the hood and the front windshield and/or the side windows one apt to be broken. Another inconvenience in this type of automobile body is that the hood has tendency of producing wind noises in high speed operation.

Another type of open top automobile body is the one which includes a rigid roof panel removably attached to the body between the front and rear windshield. This type of body structure is considered as being free from the problems as pointed above in connection with the body structure having a rearwardly foldable hood. It should however be noted that this type is disadvantageous in that the rear windshield panel remains even when the rigid roof panel is removed.

In the British Pat. No. 2086316, there is disclosed an open top automobile body structure including a hoop member of an inverted U-shape having a pair of leg portions swingably attached to the rear body portion at the opposite sides thereof. A foldable rear hood section is provided between the hoop member and the rear body portion to provide a rear windshield section when the hoop member is in the erected position. A rigid roof panel is provided so as to be mounted to extend between the front windshield structure and the hoop member to cover the top of the passenger compartment. The rigid roof panel is removable and the roof hoop member can be swung rearward from the erected position to the retracted position folding the rear hood section. The body structure as disclosed by the British patent eliminates the problems of the open top automobile body structure having a rearwardly foldable hood because it has a rigid roof structure. Further, it also eliminates the problem of the conventional open top body having a rigid roof panel because the rear windshield section can be retracted.

It should however be noted that the open top body structure as proposed by the British patent is still inconvenient to use. In fact, it is required at first to remove the roof panel and carry it to a storing site. Then, the hoop member must be swung rearward to the retracted position. It should further be noted that, when it is desired to carry the removed roof panel on the automobile, it must be stored in the trunk space so that it occupies a substantial part of the trunk space.

SUMMARY OF THE INVENTION

It is therefore an object of the present invention to provide an open top automobile body structure which is free from the aforementioned problems.

Another object of the present invention is to provide an open top structure for an automobile body which includes a rigid roof panel and retractable rear windshield section.

A further object of the present invention is to provide an open top structure for an automobile body having a rigid roof panel which is retractable together with a hoop member.

A still further object of the present invention is to provide a structure for retracting a rigid roof panel in an open top automobile body.

According to one aspect of the present invention, the above and other objects can be accomplished by an open top automobile body including a body structure having a front windshield section, opposite side panels and a rear section, a hoop member of a substantially inverted U-shape having a pair of leg portions swingably mounted respectively on the opposite side panels for movement between an erected position wherein the hoop member extends substantially upright and a retracted position wherein the hoop member is retracted in the rear section, a rigid roof panel adapted to be placed between the front windshield section and the hoop member in the erected position, the improvement resides in that said roof panel has a rear edge portion connected through hinge means to said hoop member, said rear section of the body being provided with a space for receiving said roof panel when they are retracted. Foldable hood means may be provided between the hoop member and the rear section to provide a rear windshield section.

In a preferable aspect of the present invention, a second hoop member of a substantially inverted U-shape is provided inside the hood means for engagement with the hood means to stretch the latter in the extended position, the second hoop member being swingable between an erected position and a retracted position and connected through link means with the rear edge portion of the roof panel so that the second hoop member can be moved to the retracted position together with the roof panel.

The above and other objects and features of the present invention will become apparent from the following descriptions of preferred embodiments taking reference to the accompanying drawings.

BRIEF DESCRIPTION OF THE DRAWINGS

FIG. 1C is a perspective view showing the roof panel and the hoop member in the retracted positions;

FIG. 2B is a fragmentary perspective view showing one of the leg portions of the hoop member;

FIG. 3 is a sectional view taken along the line III—III in FIG. 1A;

FIG. 4 is a sectional view taken along the line IV—IV in FIG. 1A;

FIG. 10 is a perspective view showing another embodiment of the present invention with the rear hood removed to show the link mechanism;

DESCRIPTION OF THE PREFERRED EMBODIMENTS

Figure 1A:
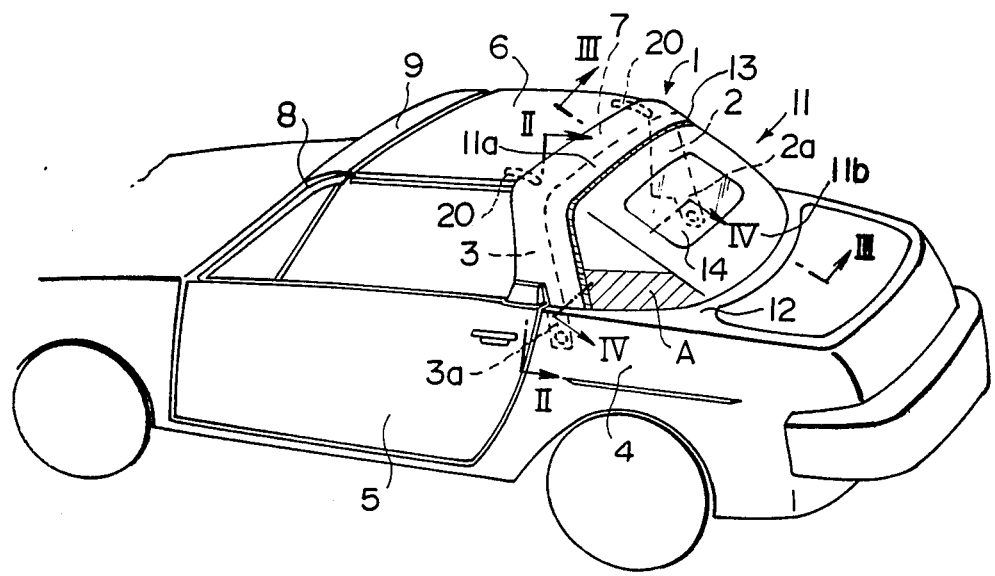
FIG. 1A is a perspective view showing an open top type automobile in accordance with one embodiment of the present invention.
Figure 1B:
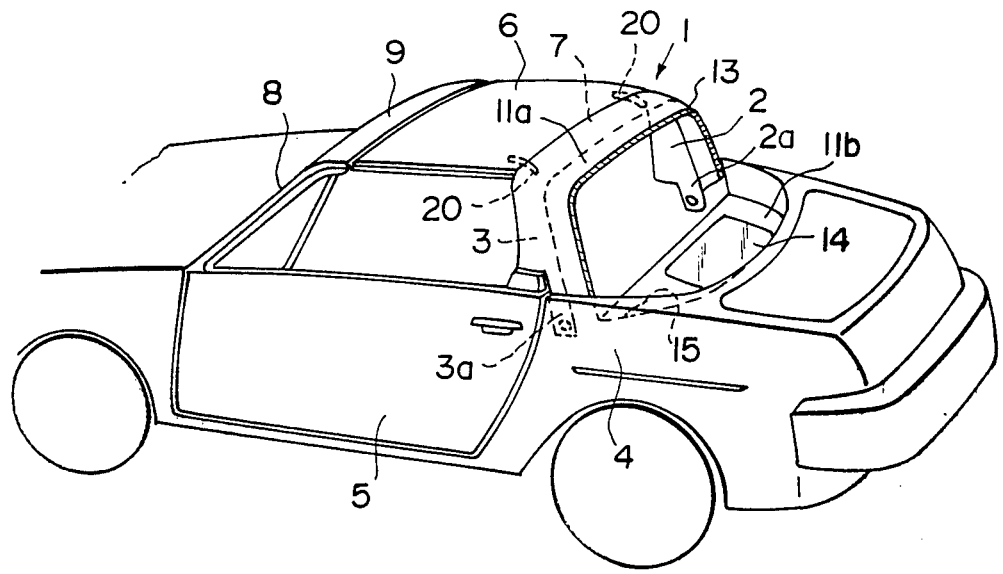
FIG. 1B is a perspective view showing the rear hood in the folded position.

Referring to the drawings, particularly to FIGS. 1A, 1B and 1C, there is shown an automobile body having a hoop member 1 of a substantially inverted U-shape including opposite leg portions 2 and 3 and a top portion 7. The leg portions 2 and 3 of the hoop member 1 are connected at the lower end portions 2a and 3a to rear fenders 4 of the body so that the hoop member 1 can be swingably moved between an erected position shown in FIG. 1A and a retracted position shown in FIG. 1C. A rigid roof panel 6 is positioned to extend between a front header 9 of a front windshield section 8 and the top portion 7 of the hoop member 1 in the erected position. As usual, side doors 5 are provided in front of the rear fenders 4. As will be described in detail later, the roof panel 6 is connected at the rear edge portion to the top portion 7 of the hoop member 1.

A rear hood 11 is provided between the hoop member 1 and the rear body section 12 so as to constitute a rear windshield section of the body. Thus, the rear hood 11 has a transparent portion 14 substantially at the center thereof. The rear hood 11 has a front section 11a and a rear section 11b which are connected together by means of a slide fastener 13. The front section 11a is attached to the hoop member 1 so as to cover the outer surface of the member 1. The rear section 11b is secured to the rear fenders 4 and the rear body section 12.

As shown in FIG. 1B, the body is formed with a storage space 15 in the rear body section for receiving the hoop member 1, the roof panel 6 and the rear hood 11. For opening the top of the passenger compartment, the rear section 11b of the rear hood 11 is at first disconnected at the slide fastener 13 from the front section 11a and the rear section 11b is folded into the storage space 15 as shown in FIG. 1B. Thereafter, the front edge portion of the roof panel 6 is disconnected from the front header 9 of the front windshield section 8 and the hoop member 1 is then swung rearward to the retracted position. Since the roof panel is hinged at the rear edge portion with the top portion 7 of the hoop member 1, the roof panel 6 is also retracted as the hoop member 1 is swung rearward. Thus, the roof panel 6 is stored as shown in FIG. 1C between the leg portions of the hoop member 1.

Referring now to FIGS. 5 through 8, there is shown hinge mechanisms for connecting the roof panel 6 with the hoop member 1. The roof panel 6 is connected with the member 1 through a pair of laterally spaced hinge mechanisms 20 but only one of them will be described because these mechanisms are symmetrical with each other.

The hinge mechanism 20 includes a first link 202 mounted on the leg portion 3 of the hoop member 1 through a first hinge pin 201 for swingable movement about the axis of the first hinge pin 201, and a second link 204 mounted on the free end of the first link 202 through a second hinge pin 203 for swingable movement about the axis of the second hinge pin 203. The hoop member 1 is provided at the leg portion with a slide pin 205 which is adapted to be engaged with an intermediate portion of the first link 202. For the purpose, the first link 202 is formed with a pin receiving groove 206. The first link 202 is formed at the free tip end with a lug 210 which is adapted to engage with a side edge of the second link 204 so that the second link 204 is restricted to rotate in one direction but permitted a free rotation only in the direction shown by an arrow 211.

The second link 204 has a lower end 212 which is engaged with a receptacle 213 mounted on the slide pin 205. The other or upper end of the second link 204 is secured to the rear edge portion of the roof panel 6. The second link 204 is formed with a pawl 215 which functions to disengage the first link 202 from the slide pin 205.

Figure 6:
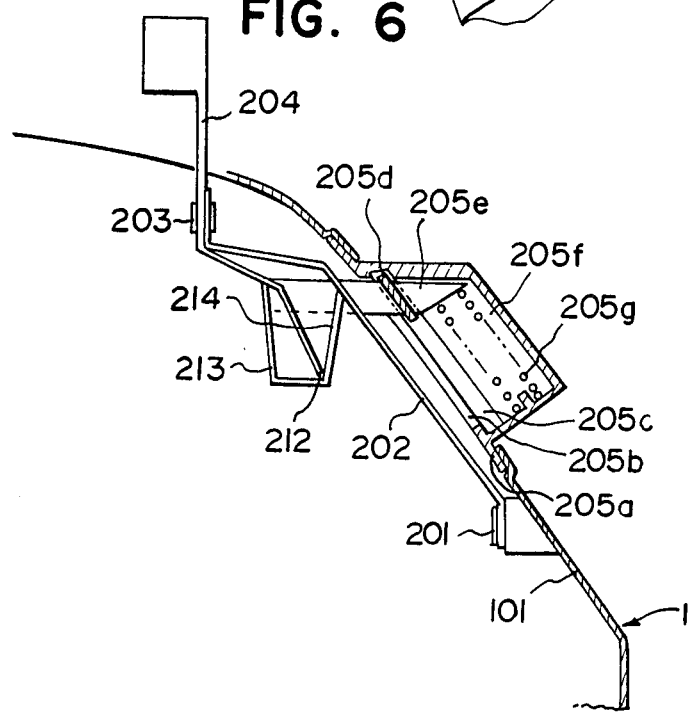
FIG. 6 is a sectional view taken along the line VI—VI in FIG. 5.
Figure 7A:
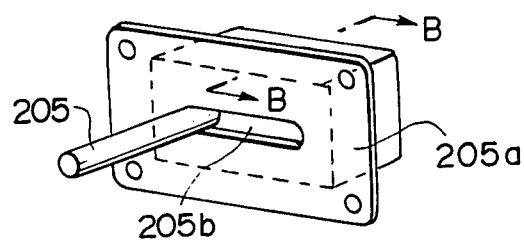
FIG. 7A is a perspective view of the pin assembly.
Figure 7B:
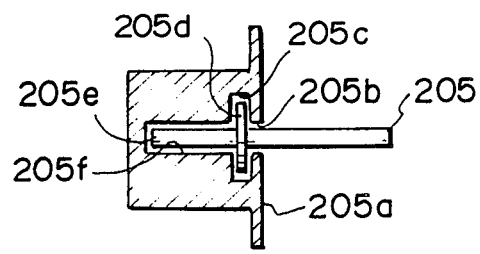
FIG. 7B is a sectional view taken along the line B—B in FIG. 7A.

Referring to FIGS. 6, 7A and 7B, there is shown a slide pin assembly including a housing 205e having a plate 205a which is attached to the inner panel 101 of the hoop member 1. The plate 205a is formed with a downwardly extending slot 205b through which the aforementioned slide pin 205 extends. The housing 205e has guide grooves 205c and 205f. The slide pin 205 is formed with a flange 205d adapted for slidable engagement with the guide groove 205c. Further, the body portion of the slide pin 205 is slidably received by the guide groove 205f. As shown in FIG. 6, a spring 205g is provided in the guide groove 205f for biasing the slide pin 205 upward. In FIG. 6, it will also be noted that the slide pin 205 projects laterally inward. The receptacle 213 is of a trapezoidal configuration having a pair of legs secured to the slide pin 205 and extends substantially downward. One of the legs of the receptacle 213 provides a slide surface 214 of the lower end 212 of the second link 209.

Figure 8A:
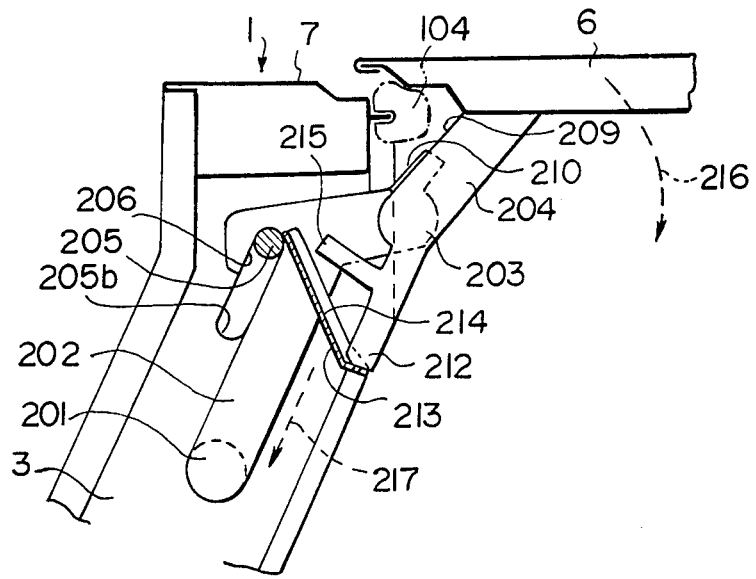
FIGS. 8A and 8B show operations of the hinge mechanism.

Referring at first to FIG. 8A, the hinge mechanism is shown in the position when the hoop member 1 is in the erected position. In this position, the groove 206 of the first link 202 is engaged with the slide pin 205 so that the first link 202 is locked against rotation about the first hinge pin 201. The second link 204 is engaged with the lug 210 on the first link 202 so that the second link 204 is restricted from a rearward rotation. A forward rotation of the second link 204 is also restricted by the roof panel 6 as far as the front edge of the rool panel 6 is engaged with front header 9.

Figure 9:
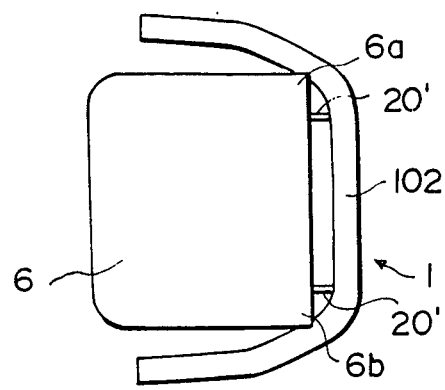
FIG. 9 is a top plan view showing the roof panel and the hoop member in the retracted positions using conventional hinges.
Figure 8B:
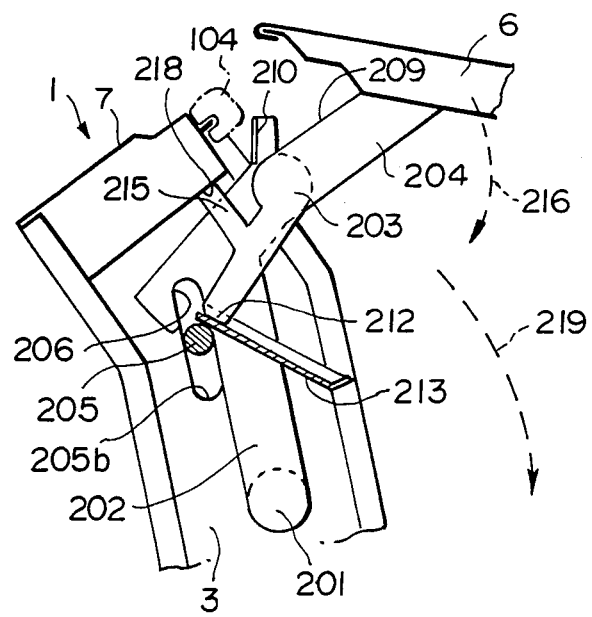

To open the top of the passenger compartment, the roof panel 6 is disconnected from the front header 9 and the hoop member 1 is swung rearward. Then, the roof panel 6 and the second link 204 are swung about the second hinge pin 203 in the direction shown by an arrow 216. Thus, the lower end 212 of the second link 204 moves along the sliding surface 214 of the receptacle to thereby force the slide pin 205 downward in the direction shown by an arrow 217. The slide pin 205 is therefore moved along the slot 205b downward as shown in FIG. 8B. In this position, the pawl 215 on the second link 204 is engaged at its tip end 218 with the top portion 7 of the hoop member 1. A further swinging movement of the roof panel 6 causes a rotation of the second hinge pin 203 about the tip end 218 producing a swinging movement of the first link 202 about the first hinge pin 201 in the direction shown by an arrow 219. This movement of the first link 202 completely disengages the slide pin 205 from the groove 206. Thereafter, the links 202 and 204 are separately swung about the hinge pins 201 and 203, respectively, to have the roof panel 6 folded to lie along the hoop member 1 as shown in FIG. 1C. The hinge mechanism is advantageous in that the rear edge of the roof panel 6 can be placed in the retracted position sufficiently away from the top portion 7 of the hoop member 1 as shown in FIG. 1C so that it is unlikely that the roof panel 6 lies on the weather strip 104 which will be provided on the front edge 102 of the hoop member 1. Thus, it is possible to prevent the weather strip 104 from being scratched by the roof panel 6. It should be noted when conventional hinge mechanisms 20' are adopted, there will be an overlap between the roof panel 6 and the hoop member 1 as shown in FIG. 9 so that there is danger of the weather strip 104 being damaged by the roof panel 6.

Figure 2A:
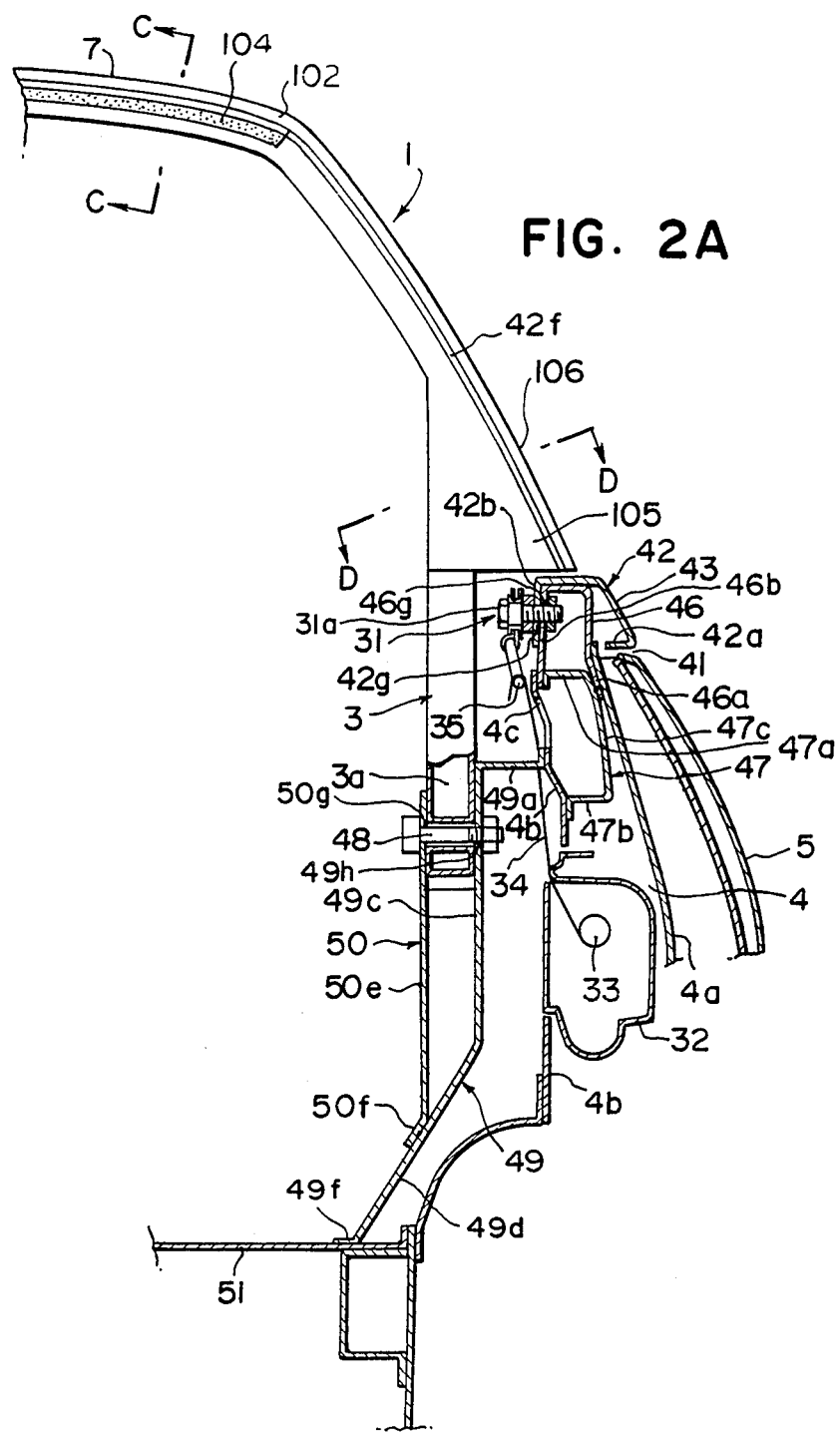
FIG. 2A is a sectional view taken along the line II—II in FIG. 1A.
Figure 2C:
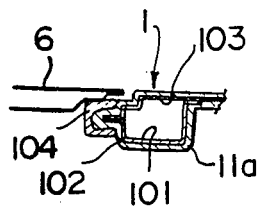
FIG. 2C is a sectional view taken along the line C—C in FIG. 2A.

Referring now to FIGS. 2A through 2F, there is shown a mounting mechanism of the hoop member 1. As described, the member 1 is pivotably mounted at the lower ends 2a and 3a of the leg portions 2 and 3, respectively, on the rear fender portions 4 of the body. As shown in FIG. 2C, the hoop member 1 comprises the aforementioned inner panel 101 and an outer panel 103 which are welded together to form a structure of a closed cross-section. The front section 11a of the rear hood 11 is attached to the hoop member 1 to encircle the member 1. At the front edge portion 102 of the hoop member 1, there is the aforementioned weather strip 104 which is coextensive with the rear edge of the roof panel 6.

Referring to FIG. 2A, it will be noted that the rear fender 4 is comprised of an outer panel 4a and an inner panel 4b which are connected together in a manner well known in the art. The rear fender section 4 has a front edge portion 4d which is complementary to the rear edge portion 5a of the side door 5. It will be noted in FIG. 1A that the leg portions 2 and 3 extend upward from the positions where the rear edge portion 5a of the side door 5 meets the front edge portion 4d of the rear fender section 4. In order to provide a smooth continuous contour between the hoop member 1 and the rear fender section 4, the rear feander section is formed with a deck 42 which projects from the upper edge 41 of the rear fender section 4.

Figure 2D:
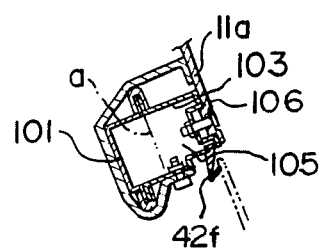
FIG. 2D is a sectional view taken along the line D—D in FIG. 2A.

As shown in FIG. 2B, the leg portion 3 of the hoop member 1 is formed at a lower portion with a laterally outwardly bulged portion 105 having a bottom which is faced to the upper surface of the deck 42. The bulged portion 105 on the hoop member 1 has a laterally outer surface 106 which is continuous with the laterally outer surface 43 of the support deck 42 which is in turn continuous with the outer surface 44 of the rear fender section 4. It will therefore be understood that a smooth continuous contour is formed throughout the hoop member 1, the deck 42 and the rear fender section 4 when the hoop member 1 is in the erected position. In FIG. 2D, the outer contour of the upper portion of the leg 3 is shown by a phantom line a so that it will be understood that the bulged portion 105 expands the contour of the hoop member 1 to align with the contour of the support deck 42.

At the upper end 45 of the front edge portion 4d, the rear fender section has a reinforcement 46 of an inverted U-shape having downwardly extending leg portions 46a and 46b respectively connected with the outer panel 4a and the inner panel 4b of the rear fender section 4. The deck 42 is located to cover the upper part of the reinforcement 46 as shown in FIG. 2A. AS shown, the deck 42 is of a trapezoidal cross-sectional configuration having an outer leg providing the laterally outer surface 43. The outer leg is bent at the lower end inwardly to provide a bottom flange 42a. The deck 42 further has an inner leg 42b which is overlapped with and welded to the inner leg 46b of the reinforcement 46.

Figure 2E:
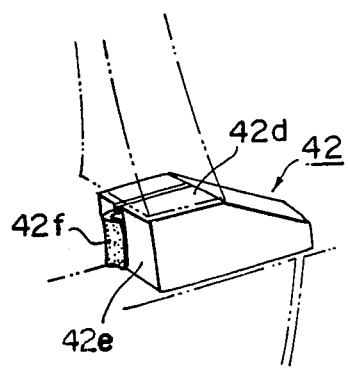
FIG. 2E is a perspective view showing the support for the leg portion of the hoop member.
Figure 2F:
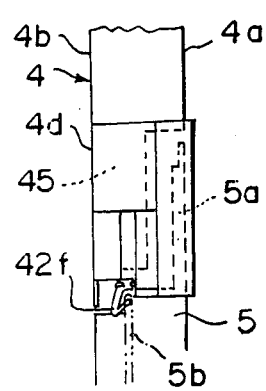
FIG. 2F is a top plan view of the support shown in FIG. 2E.

The overall configuration of the deck 42 is shown in FIG. 2E. As shown, the deck 42 has a top surface 42d including a substantially horizontal forward portion and a downwardly sloped rearward portion extending from the forward portion. As described previously, the bottom of the leg portion of the hoop member 1 is faced to the horizontal forward portion of the deck 42. The deck 42 has a front wall 42e which carries a weather strip 42f for providing a weather tight seal between the front wall 42e of the deck 42 and the rear edge of a window glass 5b which is retractably mounted in the side door 5, as shown in FIG. 2F. A similar weather strip 42f is also provided along the front edge of the leg portion of the hoop member 1 as shown in FIG. 2D.

Referring again to FIG. 2A, it will be noted that the inner leg 42b of the deck 42 and the inner leg 46b of the reinforcement 46 are respectively formed with through-holes 42g and 46g which are aligned with each other. A belt anchor 31 is installed to the reinforcement 46 by means of a bolt 31a inserted into the holes 42g and 46g. In FIG. 2A, it will also be noted that a second reinforcement 47 is provided beneath the reinforcement 46. The reinforcement 47 is of a laterally inwardly opened channel shaped cross-section having an upper wall 47a, a lower wall 47b and a vertical wall 47c. The upper wall 47a is welded to the inner leg 46b of the reinforcement 46 and the lower wall 47b in welded to the inner panel 4b of the rear fender section 4. The vertical wall 47c is welded to the outer leg 46a of the reinforcement 46 and the outer panel 4a of the rear fender section 4. The reinforcement 47 extends longitudinally from the front edge portion of the rear fender section 4 to the rear body section 12. The inner panel 4b of the rear fender section 4 is appropriately formed with access holes 4c for making it possible to carry out spot weldings of the reinforcement 47.

A seat belt retractor 32 is mounted on the inner panel 4b of the rear fender 4 beneath the reinforcement 47b.

The retractor 32 has a belt take-up reel 33 from which a seat belt 34 extends to a hook 35 of the seat belt anchor 31 on the deck 42.

Figure 2G:
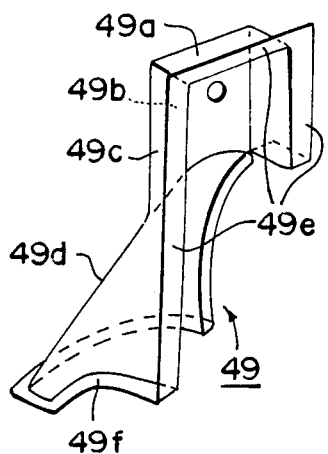
FIG. 2G is a perspective view showing the reinforcement member.
Figure 5:
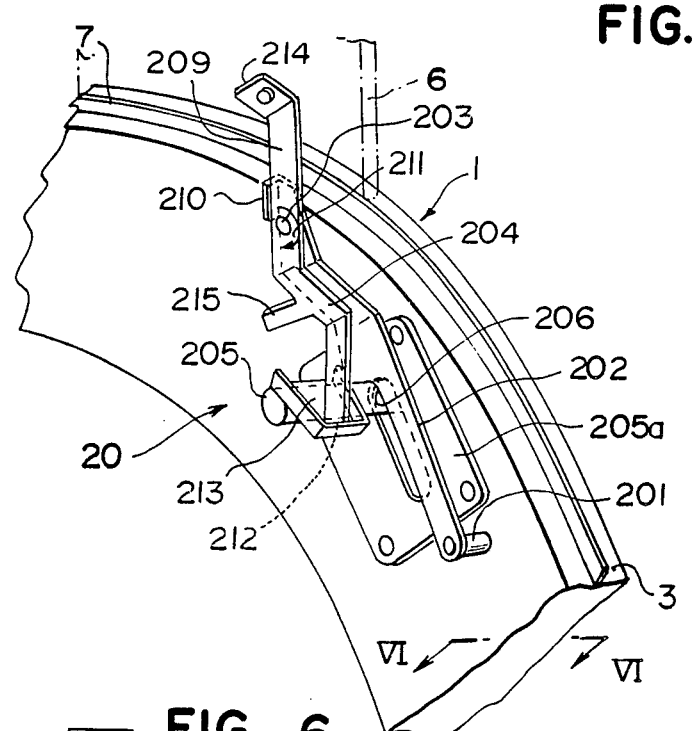
FIG. 5 is a perspective view of the hinge mechanism.

Referring to FIG. 2A, it will be noted that the leg portion 3 of the hoop member 1 is mounted on the inner panel 4b of the rear fender 4 through a pivot pin 48. For the purpose, the inner panel 4b is provided with reinforcements 49 and 50. As shown specifically in FIG. 2G, the reinforcement 49 includes an upper part which is of a substantially channel shaped cross-section which is opened laterally outward. The upper part has an upper wall 49a, an inner wall 49b and a front wall 49c, the inner wall 49b and the front wall 49c being continuous with a lower part 49d which is inclined laterally inward and forward as shown. An attachment flange 49e is formed along the laterally outer periphery of the reinforcement 49. A lower attachment flange 49f is formed along the lower periphery of the reinforcement 49. The reinforcement 49 is attached to inner panel 4b of the rear fender 4 at the flange 49e and to the floor panel 51 at the flange 49f. The reinforcement 50 is of a substantially channel shaped cross-section and extends substantially vertically. Although not shown in the drawings, the reinforcement 50 is attached at the front and rear edge portions to the reinforcement 49. The reinforcement 50 has an inner wall 50e which is formed at the lower end with a flange 50f attached to the lower part 49d of the reinforcement 49.

It will be noted that the inner wall 49c of the reinforcement 49 is spaced apart from the inner wall 50e of the reinforcement 50 by a distance corresponding to the thickness of the leg portion 3 of the hoop member 1. The reinforcements 49c and 50e are formed with pivot pin holes 49h and 50g, respectively. The leg portion 3 is formed at the lower end portion with a pivot pin hole 3a which is aligned with the holes 49h and 50g. The pivot pin 48 is inserted into these holes 49h, 50g and 3a to mount the hoop member 1 for swinging movements.

Referring now to FIGS. 3 and 4, it will be noted that the rear part 11b of the rear hood 11 includes an outer cloth 11c which is attached to a main cloth 11d at an area shown by A in FIG. 1A. The outer cloth 11c is secured at the laterally inner edge to an intermediate part of the main cloth 11d. The inner cloth 11d is secured to the rear fender 4 at the outer edge 11e through a sealing strip 11f. The outer edge 11g of the outer cloth 11c is attached removably to the outer edge 11e of the main cloth 11d. The main cloth 11d has a folded portion 11j beneath the outer cloth 11c as shown in FIG. 4. A resilient stretching member 11k is provided to maintain the main cloth in a stretched condition.

The rear hood 11 is shown in a stretched position by solid lines in FIGS. 3 and 4. For folding the hood 11, the rear part 11b is separated by the slide fastener 13 by the front part 11a and the outer edge 11g of the outer cloth 11c is removed from the outer edge 11e of the main cloth 11d. Then, the rear part 11b of the hood 11 can be laid down along the floor 151 of the storage section 15. In this instance, the resilient stretching member 11k is expanded and the folded portion 11j of the main cloth 11c is extended to lay down along the floor 151 of the storage section 15.

Referring to FIG. 3, it will be noted that the outer cloth 11c is continued to the rear portion of the hood 11. In the rear portion, however, the rear edge 11g of the outer cloth 11 is not attached to the rear edge of the main cloth 11d but to a retaining member 11l of a substantially L-shaped cross section provided in the rear body section. The retaining member 11l is arranged with the corner 11m of the L-shaped directed upward and the fasteners for attaching the rear edge 11g of the outer cloth 11c are provided on the corner 11m of the L-shaped of the retaining member 11l.

Referring now to FIGS. 10 through 16, there is shown another embodiment of the present invention. This embodiment includes an upper hood stretching linkage 50, a peripheral hood stretching linkage 80 and a connecting linkage 70. The upper hood stretching linkage 50 includes a stretching bar 52 carried by an upper link 51 which is of a substantially inverted U-shaped. At each end, the upper link 51 is formed with a lug 53 connected with an upper end of a lower link 55. The lower link 55 has a lower end pivotably connected to the rear fender 4.

The peripheral hood stretching linkage 80 includes a substantially U-shaped rear link 81 having opposite ends connected with rear ends of a pair of front links 82. The connecting linkage 70 inclues a first connecting link 71 having a rear end 71a pivotably connected to the upper link 51 and a second connecting link 72 having a rear end 72a pivotably connected to a front end 71b of the first link 71, an intermediate portion 72b pivotably connected to the hoop member 1 and a front end 72c secured to the roof panel 6. Although only one connecting linkage 70 is shown in FIG. 10 at the left side of the body, a similar connecting linkage may be provided at the right side.

A bracket plate 59 is secured to the hoop member 1 through a reinforcement 58 to pivotably mount the lower end portion of the upper link 51 of the upper hood stretching linkage 50. The plate 59 has a lug pivotably connected with the front end of the front link 82 of the peripheral hood stretching linkage 80. A pair of stretching belts 41 and 42 extends substantially longitudinally along the inside of the rear hood 11 and have front ends connected to the hoop member 1 and rear ends connected to the rear link 81 of the rear stretching linkage 80. The belts 41 and 42 are passed between the stretching bar 52 and the upper link 51.

Figure 11:
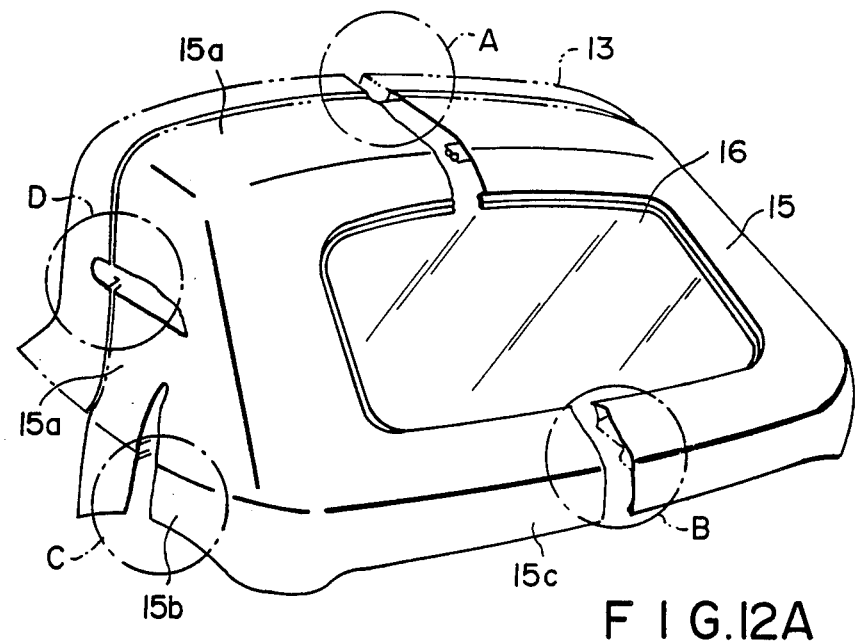
FIG. 11 is a perspective view showing the installation of the rear hood.
Figure 12A:
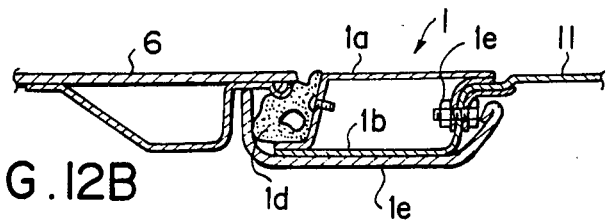
FIGS. 12A through 12D are sectional views showing details of the installation of the rear hood.

Referring to FIGS. 12A through 12D together with FIG. 11, it will be noted in FIG. 12A that the hoop member 1 is comprised of an outer panel 1a and an inner panel 1b which are welded together to form a structure of closed cross-section. The hoop member 1 has a weather strip 1d along the front edge to provide a weather tight seal between the roof panel 6 and the hoop member 1. The rear hood 11 is connected at the front edge to the rear edge of the member 1 by means of bolts 1e and the inner surface of the hoop member 1 is covered by an inner trim 1c.

Figure 12B:
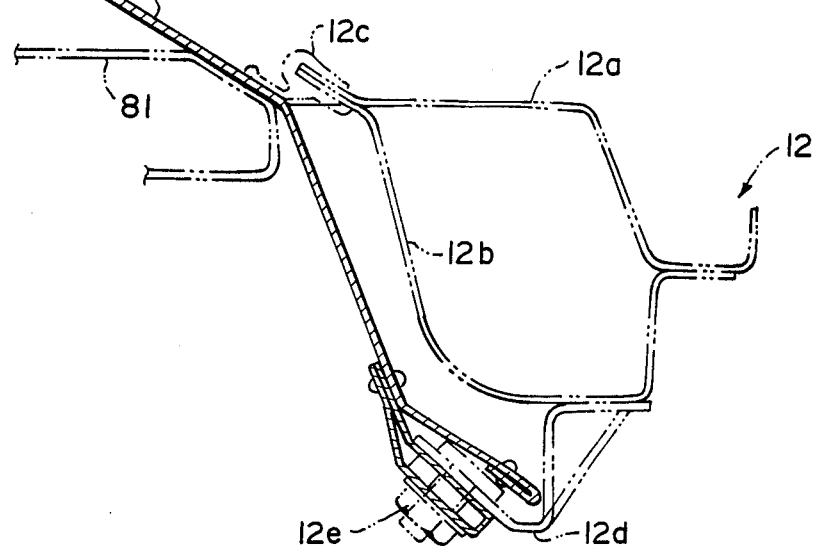

Adjacent to the rear edge portion of the rear hood 11, the rear body section 12 is provided with a front edge structure comprised of an outer panel 12a and an inner panel 12b which are welded together to form a structure of closed cross-section. A plate 12d of a substantially S-shaped cross-section is attached to the lower side of the inner panel 12b and the rear edge of the hood 11 is secured to the plate 12d by means of bolts 12e. At the front edge of the front edge structure, there is a weather strip 12c which is adapted to be engaged with the rear hood 11 to provide a weather tight seal therebetween. As shown in FIG. 12B, the rear link 81 is positioned to support the hood 11 against the weather strip 12c.

Figure 12C:
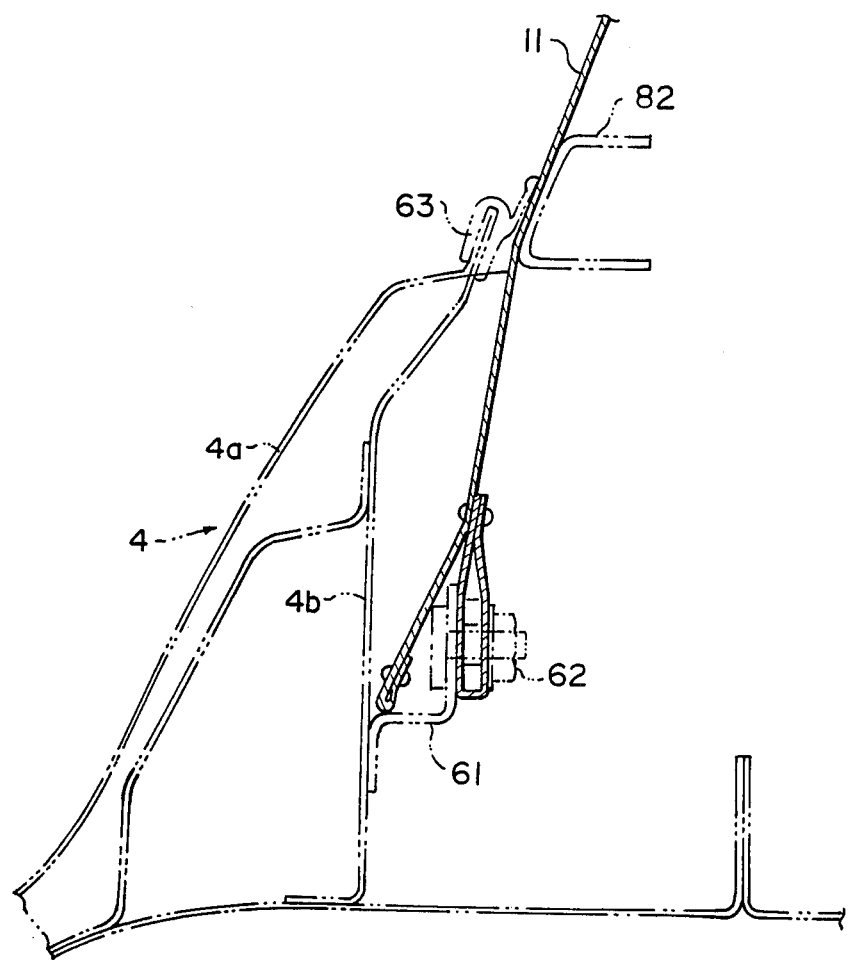

Referring to FIG. 12C, it will be noted that the inner panel 4b of the rear fender 4 has a plate 61 of a substantially Z-shaped cross-section and the lower edge of the hood 11 is secured to the plate 61 by means of bolts 62. Along the upper edge of the rear fender 4, there is provided a weather strip 53 which is adapted to be engaged with the hood 11. The front link 82 forces the hood 11 toward the weather strip 63.

Figure 12D:
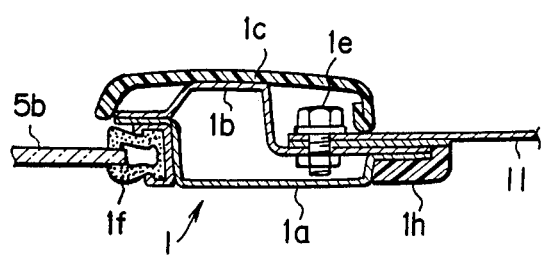

Referring to FIG. 12D, the hoop member 1 is provided along the front edge with a weather strip 1f which is adapted for a weather tight engagement with the rear edge of the side window glass 5b. A trim 1h is provided along the rear edge of the hoop member 1.

Figure 13:
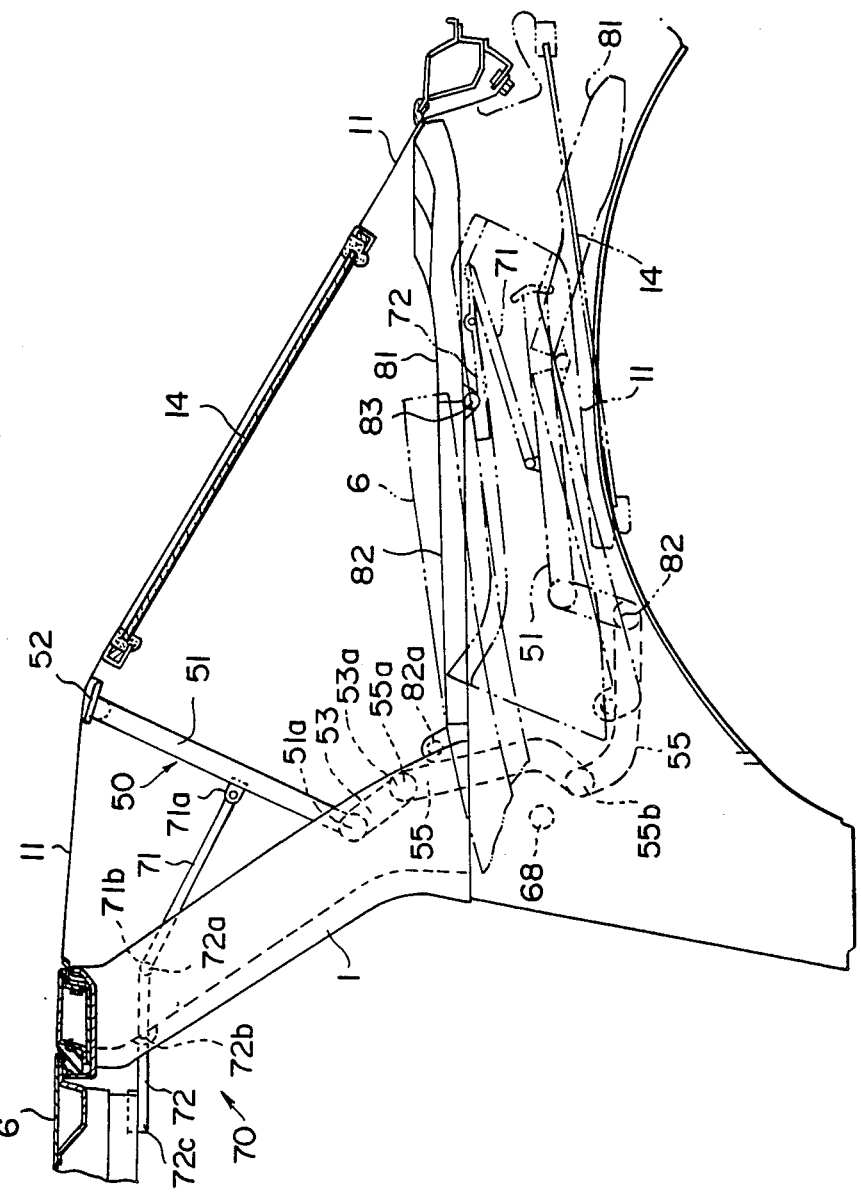
FIG. 13 is a longitudinal section of the upper body structure.
Figure 14:
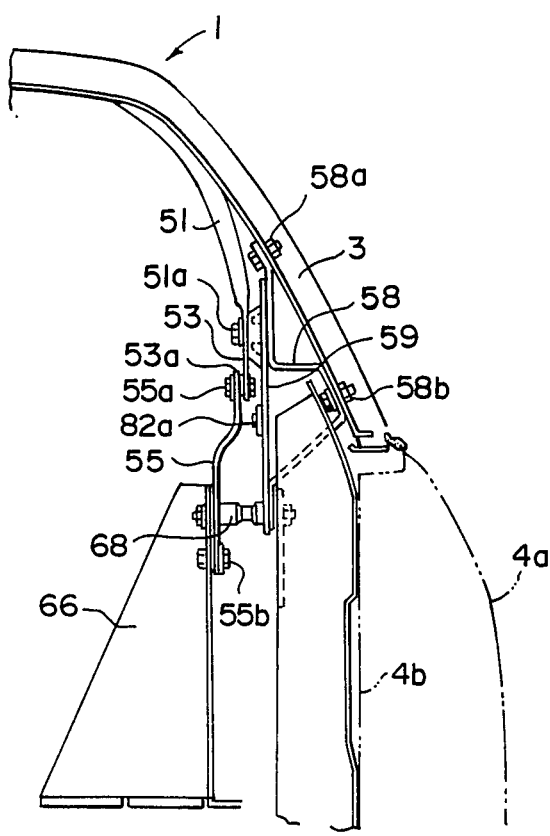
FIG. 14 is a cross-section of the upper body structure.

Referring now to FIGS. 13 and 14, it will be noted in FIG. 14 that the aforementioned reinforcement 58 is secured to the leg portion 3 of the hoop member 1 by means of bolts 58a and 58b. The upper and lower ends of the members 58 and 59 are welded together as shown and the members 58 and 59 are pivotably connected to the rear fender 4 by means of a pivot pin 68, as shown in FIG. 13, the stretching bar 52 carried by the upper link 51 engages the rear hood 11 above the transparent part 14 to stretch the hood 11. The hood 11 has a portion extending forwardly from the stretching bar 52 in a substantially horizontal manner to provide a continuous roof contour. With this arrangement, it becomes possible to provide a large area for the transparent portion 14. The upper link 51 is rearwardly bent at the point 51a to form the aforementioned lug 53 which is connected at the rear end 53a with an upper end 55a of the lower link 55. The lower end of the lower link 55 is pivotably mounted on a bracket 66. The upper link 51 is pivotably connected to the upper end portion of the plates 58 and 59 which are secured to the hoop member 1.

Figure 16:
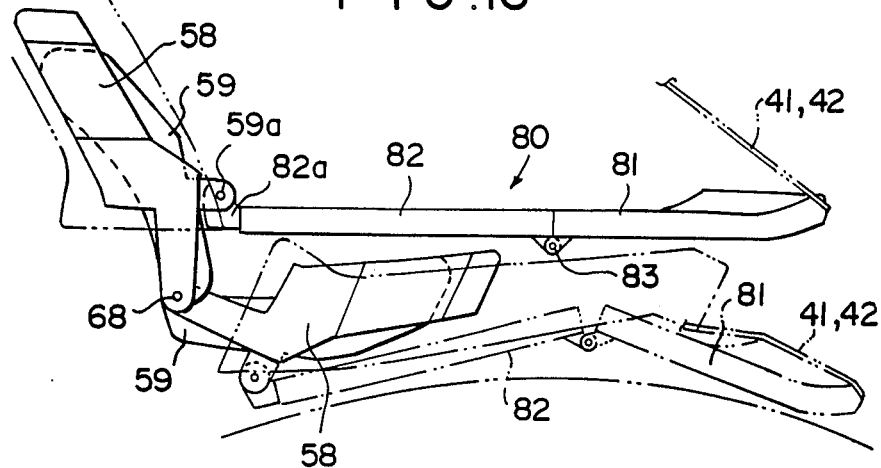
FIG. 16 is a side view showing another portion of the link mechanism.

As shown in FIG. 16, the rear link 81 and the front link 82 of the peripheral stretching linkage 80 are pivotably connected together by a pivot pin 83. The front link 82 has a front end 82a pivotably connected with a rear end 59a of the plate 59. In FIGS. 13 and 16, the linkage 80 is shown in a raised position by solid lines. When the hoop member 1 is swung rearward to open the top of the passenger compartment, the front link 82 is lowered through a rearward swinging movement of the plate 59. At the same time, the belts 41 and 42 are loosened so that the rear link 81 is also lowered to the position shown by phantom lines.

As already described, the roof panel 6 is connected through the second link 72 of the connecting linkage 70 to the hoop member 1. Further, the upper link 51 of the upper stretching linkage 50 is connected through the links 71 and 72 to the hoop member 1. It will therefore be understood that when the hoop member 1 is swung rearward, the roof panel 6 is also retracted simultaneously with the linkage 50, 70 and 80.

Figure 15:
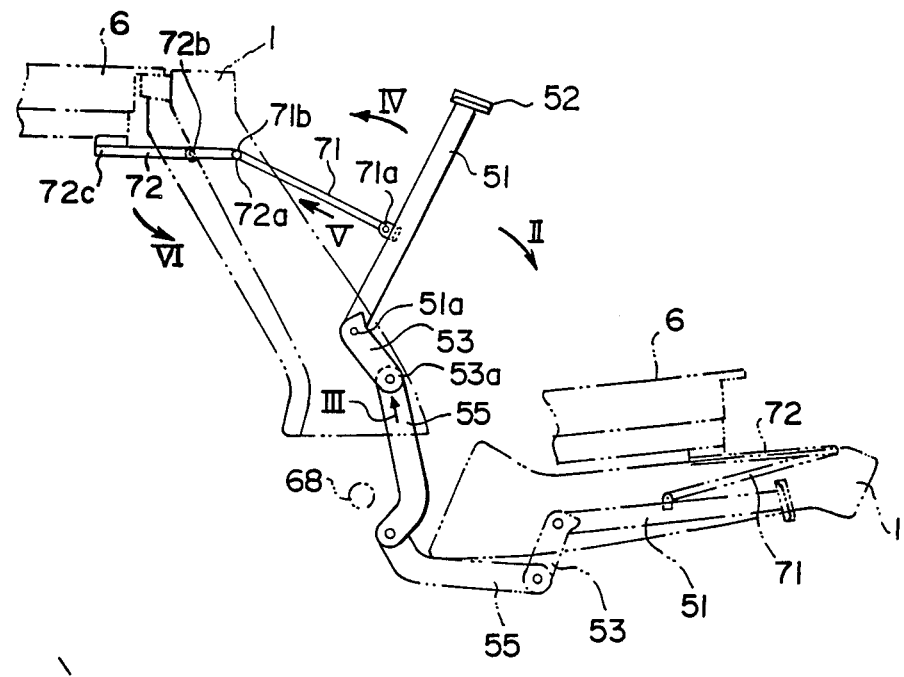
FIG. 15 is a side view of the link mechanism.

Referring now to FIG. 15, the linkages are shown by solid lines in positions corresponding to the erected position of the hoop member 1. When the hoop is swung rearward as shown by an arrow II in FIG. 15, the upper link 51 is moved rearward and the lower link 55 is swung rearward about the pivot point at the lower end thereof. Since the pivot pin 68 for connecting the leg portion 3 of the hoop member 1 is located upward the point of pivot connection between the lower end 55b of the lower link 55 and the rear fender 4, the upper end 55a of the lower link 55 tends to force the rear end 53a of the lug 53 upward as shown by an arrow III in FIG. 15. Thus, the upper link 51 is swung with respect to the hoop member 1 in the direction shown by an arrow IV in FIG. 15 so that the upper link 51 is folded on the hoop member 1 as shown by phantom lines.

The first connecting link 71 tends to force the rear end 72a of the second connecting link 72 in the direction shown by an arrow V so that the second link 72 is turned in the direction shown by an arrow VI. Thus, the roof panel 6 is also folded on the hoop member 1.

The invention has thus been shown and described with reference to specific embodiments, however, it should be noted that the invention is in no way limited to the details of the illustrated structures but changes and modifications may be made without departing from the scope of the appended claims.

We claim:

1. An open top automobile body including a body structure having a front windshield section, opposite side panels and a rear section, a hoop member of a substantially inverted U-shape having a pair of leg portions swingably mounted respectively on the opposite side panels for movement between an erected position wherein the hoop member extends substantially upright and a retracted position wherein the hoop member is retracted in the rear section, a rigid roof panel adapted to be placed between the front windshield section and the hoop member in the erected position, said roof panel having a rear edge portion connected through hinge means to said hoop member, foldable hood means between said rear section and the hoop member in the erected position, said hood means having a front edge portion attached to the hoop member and a rear edge portion attached to the rear section, said rear section of the body being provided with a space for receiving said roof panel, said hoop member and said hood means when they are retracted, said hinge means including a first link having one end connected with said hoop member and a second link having one end connected to said roof panel, a further portion of said secod link being pivotably connected with the other end of the first link, locking means for preventing a relative rotation of the first and second links when the hoop member is in the erected position and said roof panel is placed between the front windshield and the hoop member.

2. An automobile body in accordance with claim 1 in which said first link is pivotably mounted at said one end on said hoop member for swingable movement about a first axis and said second link having its one end secured to said roof panel and a portion spaced apart from said one end and of said second link pivotably connected with the other end of the first link for swinging movement about a second axis.

3. An automobile body in accordance with claim 2 in which said hoop member is provided with a slide pin extending laterally inwardly from the hoop member, said first link being formed at an intermediate portion with a groove for receiving said slide pin so that the first link is locked on the hoop member when the slide pin is engaged with the groove in the first link to allow the second link to pivot about the second axis.

4. An automobile body in accordance with claim 3 in which said first link being provided at a portion adjacent to said other end with stop means for engagement with said second link in the erected position of the hoop member for prohibiting a further swinging movement of the first link with respect to the second link beyond positions corresponding to the erected position of the hoop member.

5. An automobile body in accordance with claim 3 in which said second link has a portion extending beyond the second axis to define the other end of the second link, said slide pin being provided with a receptacle for slidably receiving the other end of the second link.

6. An automobile body in accordance with claim 5 in which said receptacle has a sliding surface along which the other end of the second link is slidably moved, said sliding surface being directed so that the slide pin is moved away from the groove in said first link when the roof panel is swingably moved with respect to the hoop member.

7. An automobile body in accordance with claim 3 in which said second link is provided with means which is adapted to be engaged with said hoop member when the roof panel is folded toward the hoop member beyond a predetermined amount to provide a pivot about which the roof panel is swung in a further folding movement to thereby disengage the slide pin from the groove in the first link.

8. An automobile body in accordance with claim 3 in which said slide pin is provided on the hoop member along a slot structure in the hoop member.

9. An automobile body in accordance with claim 8 in which said slide pin is spring biased upwardly to a position wherein it can engage the groove in the first link.

10. An automobile body in accordance with claim 1 which includes foldable hood means extending between the hoop member and the rear section.

11. An automobile body in accordance with claim 10 in which said hood means includes a transparent portion.

12. An automobile body in accordance with claim 10 in which said hood means includes a front hood section attached to the hoop member and a rear hood section secured to the rear section of the body, the front hood section and the rear hood section being connected together by fastener means.

13. An automobile body in accordance with claim 10 in which said hood means includes a main cloth secured to the rear section of the body and an outer cloth having one edge secured to the main cloth and the other edge removably attached by fastener means to the rear section of the body, the main cloth being partly folded beneath the outer cloth when the other edge of the outer cloth is attached to the rear section of the body.

14. An automobile body in accordance with claim 1 in which said leg portions of the hoop member extend inside the side panels and are pivotably attached thereto.

15. An automobile body in accordance with claim 14 in which said hoop member is formed at the leg portions with laterally outwardly bulged portions which provide continuous contours with outer contours of the side panels.

16. An automobile body in accordance with claim 15 in which said side panel is provided with a deck which projects upwardly from an upper edge of the side panel, said deck having an outer contour continuous with the outer contour of the leg portion of the hoop member.

17. An automobile body in accordance with claim 16 in which said deck has a substantially flat top surface and a rearwardly inclined surface extending rearwardly from said top surface.

18. An automobile body in accordance with claim 17 in which said deck has a front edge carrying a weather strip.

19. An automobile body in accordance with claim 1 in which said locking means includes a slide pin engaged with a groove structure in the hoop member and having receptacle means provided thereon, an extension provided on said second link to extend from the other end of the second link and adapted to engage with said receptacle means, resilient means for urging the slide pin to a position where it engages one of the first and second links to thereby prevent the relative rotation of the first and second links.

20. An automobile body in accordance with claim 1 in which said hoop member has a front edge provided with weather seal means which is adapted to be engaged with a rear edge portion of the roof panel when the hoop member is in the erected position and the roof panel is placed between the front windshield and the hoop member.

21. An automobile body in accordance with claim 1 in which said hoop member has a front edge provided with weather strip means.

22. An open top automobile body including a body structure having a front windshield section, opposite side panels and a rear section, a hoop member of a substantially inverted U-shape having a pair of leg portions swingably mounted respectively on the opposite side panels for movement between an erected position wherein the hoop member extends substantially upright and a retracted position wherein the hoop member is retracted in the rear section, a rigid roof panel adapted to be placed between the front windshield section and the hoop member in the erected position, said roof panel having a rear edge portion connected through hinge means to said hoop member, said rear section of the body being provided with a space for receiving said roof panel when it is retracted, said hinge means including a first link pivotably mounted at one end on said hoop member for swingable movement about a first axis and a second link having one end secured to said roof panel and a portion spaced apart from said one end and pivotably connected with the other end of the first link for swingable movement about a second axis, said hoop member being provided with a slide pin extending laterally inwardly from the hoop member, said first link being formed at an intermediate portion with a groove for receiving said slide pin so that the first link is locked on the hoop member when the slide pin is engaged with the groove in the first link to allow the second link to pivot about the second axis.

23. An automobile body in accordance with claim 22 in which said first link is provided at a portion adjacent to said other end with stop means for engagement with said second link in the erected position of the hoop member for prohibiting a further swinging movement of the first link with respect to the second link beyond a select position.

24. An automobile body in accordance with claim 22 in which said second link has a portion extending beyond the second axis to define the other end of the second link, said slide pin being provided with a receptacle for slidably receiving the other end of the second link.

25. An automobile body in accordance with claim 22 in which said receptacle has a sliding surface along which the other end of the second link is slidably moved, said sliding surface being directed so that the slide pin is moved away from the groove in said first link when the roof panel is swingably moved with respect to the hoop member.

26. An automobile body in accordance with claim 22 in which said second link is provided with means which is adapted to be engaged with said hoop member when the roof panel is folded toard the hoop member beyond a predetermined amount to provide a pivot about which the roof panel is swung in a further folding movement to thereby disengage the slide pin from the groove in the first link.

27. An automobile body in accordance with claim 22 in which said slide pin is provided on the hoop member along a slot structure in the hoop member.

28. An automobile body in accordance with claim 27 in which said slide pin is spring biased upwardly to a position wherein it can engage the groove in the first link.

29. An automobile body in accordance with claim 22 which includes foldable hood means extending between the hoop member and the rear section.

30. An automobile body in accordance with claim 29 in which said hood means includes a transparent portion.

31. An automobile body in accordance with claim 29 in which said hood means includes a front hood section attached to the hoop member and a rear hood section secured to the rear section of the body, the front hood section and the rear hood section being connected together by fastener means.

32. An automobile body in accordance with claim 29 in which said hood means includes a main cloth secured to the rear section of the body and an outer cloth having one edge secured to the main cloth and the other edge removably attached by fastener means to the rear section of the body, the main cloth being partly folded beneath the outer cloth when the other edge of the outer cloth is attached to the rear section of the body.

33. An automobile body in accordance with claim 22 in which said leg portions of the hoop member extend inside the side panels and are pivotably attached thereto.

34. An automobile body in accordance with claim 33 in which said hoop member is formed at the leg portions with laterally outwardly bulged portions which provide continuous contours with outer contours of the side panels.

35. An automobile body in accordance with claim 33 in which said side panel is provided with a deck which projects upwardly from an upper edge of the side panel, said deck having an outer contour continuous with the outer contour of the leg portion of the hoop member.

36. An automobile body in accordance with claim 35 in which said deck has a substantially flat top surface and a rearwardly inclined surface extending rearwardly from said top surface.

37. An automobile body in accordance with claim 36 in which said deck has a front edge carrying a weather strip.

38. An open top automobile body including a body structure having a front windshield section, opposite side panels and a rear section, a hoop member of a substantially inverted U-shape having a pair of leg portions swingably mounted respectively on the opposite side panels for movement between an erected position wherein the hoop member extends substantially upright and a retracted position wherein the hoop member is retracted in the rear section, a rigid roof panel adapted to be placed between the front windshield section and the hoop member in the erected position, said roof panel having a rear edge portion connected through hinge means to said hoop member, said hoop member having a front edge provided with weather seal means which is adapted to be engaged with a rear edge portion of the roof panel when the hoop member is in the erected position and the roof panel is placed between the front windshield and the hoop member, foldable hood means between said rear section and the hoop member in the erected position, said hood means having a front edge portion attached to the hoop member and a rear edge portion attached to the rear section, said rear section of the body being provided with a space for receiving said roof panel, said hoop member and said hood means when they are retracted, said hinge means including a first link having one end connected with said hoop member and a second link having one end connected to said roof panel, a further portion of said second link being pivotably connected with the other end of the first link, support means for supporting said roof panel on said hoop member when the hoop member is being moved between the erected position and the retracted position.

* * * * *